(12) United States Patent
Qiu

(10) Patent No.: US 11,131,892 B2
(45) Date of Patent: Sep. 28, 2021

(54) DISPLAY DEVICE

(71) Applicants: HKC Corporation Limited, Guangdong (CN); Chongqing HKC Optoelectronics Technology Co., Ltd., Chongqing (CN)

(72) Inventor: Bin Qiu, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 16/761,011

(22) PCT Filed: Dec. 13, 2017

(86) PCT No.: PCT/CN2017/115770
§ 371 (c)(1),
(2) Date: May 1, 2020

(87) PCT Pub. No.: WO2019/085164
PCT Pub. Date: May 9, 2019

(65) Prior Publication Data
US 2021/0033908 A1   Feb. 4, 2021

(30) Foreign Application Priority Data

Nov. 3, 2017  (CN) .......................... 201711070822.7

(51) Int. Cl.
*G02F 1/1345* (2006.01)
*G02F 1/133* (2006.01)
(Continued)

(52) U.S. Cl.
CPC ........ *G02F 1/13452* (2013.01); *G02F 1/1368* (2013.01); *G02F 1/13306* (2013.01);
(Continued)

(58) Field of Classification Search
None
See application file for complete search history.

(56) References Cited

U.S. PATENT DOCUMENTS

2006/0260977 A1* 11/2006 Lee ..................... H05K 1/0259
206/709
2008/0100763 A1*  5/2008 Park ..................... H05K 1/0259
349/42

FOREIGN PATENT DOCUMENTS

CN      1963600 A    5/2007
CN    101236315 A    8/2008
(Continued)

*Primary Examiner* — James A Dudek
(74) *Attorney, Agent, or Firm* — Muncy, Geissler, Olds & Lowe, P.C.

(57) ABSTRACT

A display device is provided. The display device comprises a display panel, a control circuit board, a driving circuit board and one or multiple electrostatic discharge structures. The display panel has a first ground terminal. The control circuit board has a second ground terminal. The driving circuit board coupled to the display panel and the control circuit board, and the driving circuit board is a COF flexible printed circuit board, and the control circuit board drives the display panel through the driving circuit board. The one or multiple electrostatic discharge structures is coupled to the display panel and the control circuit board, and is electrically connected to the first ground terminal and the second ground terminal. In a projection direction of the driving circuit board, the driving circuit board and the one or multiple electrostatic discharge structures are at least partially overlapped.

20 Claims, 5 Drawing Sheets

(51) Int. Cl.
*G02F 1/1333* (2006.01)
*G02F 1/1335* (2006.01)
*G02F 1/1368* (2006.01)

(52) U.S. Cl.
CPC .... *G02F 1/13338* (2013.01); *G02F 1/133514* (2013.01); *G02F 1/133528* (2013.01); *G02F 2202/22* (2013.01)

(56) References Cited

FOREIGN PATENT DOCUMENTS

| | | |
|---|---|---|
| CN | 100584160 C | 1/2010 |
| CN | 105607780 A | 5/2016 |
| KR | 20030037168 A | 5/2003 |

\* cited by examiner

DISPLAY DEVICE

BACKGROUND

Technical Field

This disclosure relates to a display device, and more particularly to a display device with the higher electrostatic protection ability.

Related Art

With the advancement of technology, flat panel displays have been widely applied to various fields. More particularly, a liquid crystal display device has predominant properties, such as slim and light-weighted, low power consumption and non-radiation. Such display devices are gradually replaced the conventional cathode ray tube display device and has been applied to various electronic products, such as a mobile phone, a portable multimedia apparatus, a notebook computer, a liquid crystal television, a liquid crystal display and the like.

For a liquid crystal display device, current panels still usually have defects caused by electrostatic discharge (ESD). Although the stringent electrostatic charge protective measures, comprising clean clothes and cleanliness control, have been implemented on the production line, and moisturizing measures and ion fan are also used, electrostatic charges which are invisible and intangible are still threatening the production yield all the time, and even threatening the use of the general end-user.

Hence, how to improve the electrostatic protection ability of a display device has always been a target of the industry.

SUMMARY

In view of the deficiencies of the prior art, the inventor has obtained this disclosure after development. An objective of this disclosure is to provide a display device with the higher electrostatic protection ability.

This disclosure provides a display device, comprising: a display panel, a control circuit board, a driving circuit board and at least one electrostatic discharge structure. The display panel has a first ground terminal. The control circuit board has a second ground terminal. The driving circuit board coupled to the display panel and the control circuit board, and the driving circuit board is a chip-on-film (COF) flexible printed circuit board, and the control circuit board drives the display panel through the driving circuit board. The at least one electrostatic discharge structure is coupled to the display panel and the control circuit board, and is electrically connected to the first ground terminal and the second ground terminal. In a projection direction of the driving circuit board, the driving circuit board and the at least one electrostatic discharge structure is at least partially overlapped.

In one embodiment, the display panel is an active matrix type display panel or a passive matrix type display panel.

In one embodiment, the display panel comprises a thin film transistor substrate, a color filter substrate and a liquid crystal layer interposed between the thin film transistor substrate and the color filter substrate.

In one embodiment, a plurality of the electrostatic discharge structures are disposed in a side-by-side manner and on a flexible sub-substrate.

In one embodiment, a plurality of the electrostatic discharge structures are disposed on multiple flexible sub-strates.

In one embodiment, in the projection direction of the driving circuit board, the driving circuit board and the multiple flexible substrates are disposed in an overlapped manner.

In one embodiment, the driving circuit board comprises a flexible substrate, a first electroconductive wiring and a drive element, the first electroconductive wiring and the drive element are disposed on the flexible substrate, and the drive element is electrically connected to the control circuit board and the display panel through the first electroconductive wiring.

In one embodiment, the drive element is an integrated circuit.

In one embodiment, the electrostatic discharge structure comprises at least one second electroconductive wiring, and two ends of the second electroconductive wiring are respectively connected to the first ground terminal and the second ground terminal.

In one embodiment, the driving circuit board and a plurality of the electrostatic discharge structures are completely overlapped.

In one embodiment, the display device further comprises a circuit substrate coupled to the display panel and the control circuit board, and the circuit substrate comprises said at least one electrostatic discharge structures and a flexible substrate, and said at least one electrostatic discharge structures are disposed on the flexible substrate.

In one embodiment, the display device further comprises two polarizers respectively disposed on two opposite surfaces of the display panel.

In one embodiment, the display device further comprises a backlight module disposed opposite to the display panel.

In one embodiment, the display device further comprises a touch sensing circuit disposed on the display panel.

In one embodiment, the display device further comprises a polarizer and a touch sensing circuit, and the polarizer is disposed on the display panel and the touch sensing circuit disposed between the display panel and the polarizer.

In one embodiment, a touch panel is disposed opposite to the display panel.

In one embodiment, the touch panel comprises a touch sensing circuit and a protection substrate, and the touch sensing circuit is disposed on a surface of the protection substrate close to the display panel.

In one embodiment, the display device is a liquid crystal display device or an organic light emitting diode display device.

This disclosure further provides a display device, comprising: a display, a control circuit board, a driving circuit board and at least one electrostatic discharge structure. The display panel has a first ground terminal. The control circuit board has a second ground terminal. The driving circuit board coupled to the display panel and the control circuit board, and the control circuit board drives the display panel through the driving circuit board, and the driving circuit board is a chip-on-film (COF) flexible printed circuit board and comprises a flexible substrate, a first electroconductive wiring and a drive element, the first electroconductive wiring and the drive element are disposed on the flexible substrate, and the drive element is electrically connected to the control circuit board and the display panel through the first electroconductive wiring; and at least one electrostatic discharge structures coupled to the display panel and the control circuit board, and comprises at least one second electroconductive wiring, and two ends of the second electroconductive wiring are respectively connected to the first ground terminal and the second ground terminal. In a projection direction of the driving circuit board, the driving circuit board and the at least one electrostatic discharge structure is at least partially overlapped.

In summary, in the display device provided by this disclosure, the driving circuit board is coupled to the display panel and the control circuit board. The driving circuit board is the chip-on-film (COF) flexible printed circuit board. The control circuit board drives the display panel through the driving circuit board. At least one electrostatic discharge structure is coupled to the display panel and the control circuit board, and the electrostatic discharge structure is electrically connected to the first ground terminal of the display panel and the second ground terminal of control circuit board. In the projection direction of the driving circuit board, the driving circuit board and the electrostatic discharge structure is at least partially overlapped. Accordingly, when electrostatic charges generate, the electrostatic charges may be conducted to the first ground terminal of the display panel or the second ground terminal of the control circuit board through said at least one electrostatic discharge structure so as to prevent damages to the device or circuits resulting from the electrostatic charges from bombarding the chip-on-film (COF) flexible printed circuit board. Hence, the electrostatic charge protective effect of the display device can be improved.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings.

DETAILED DESCRIPTION OF THE INVENTION

Figure 1:
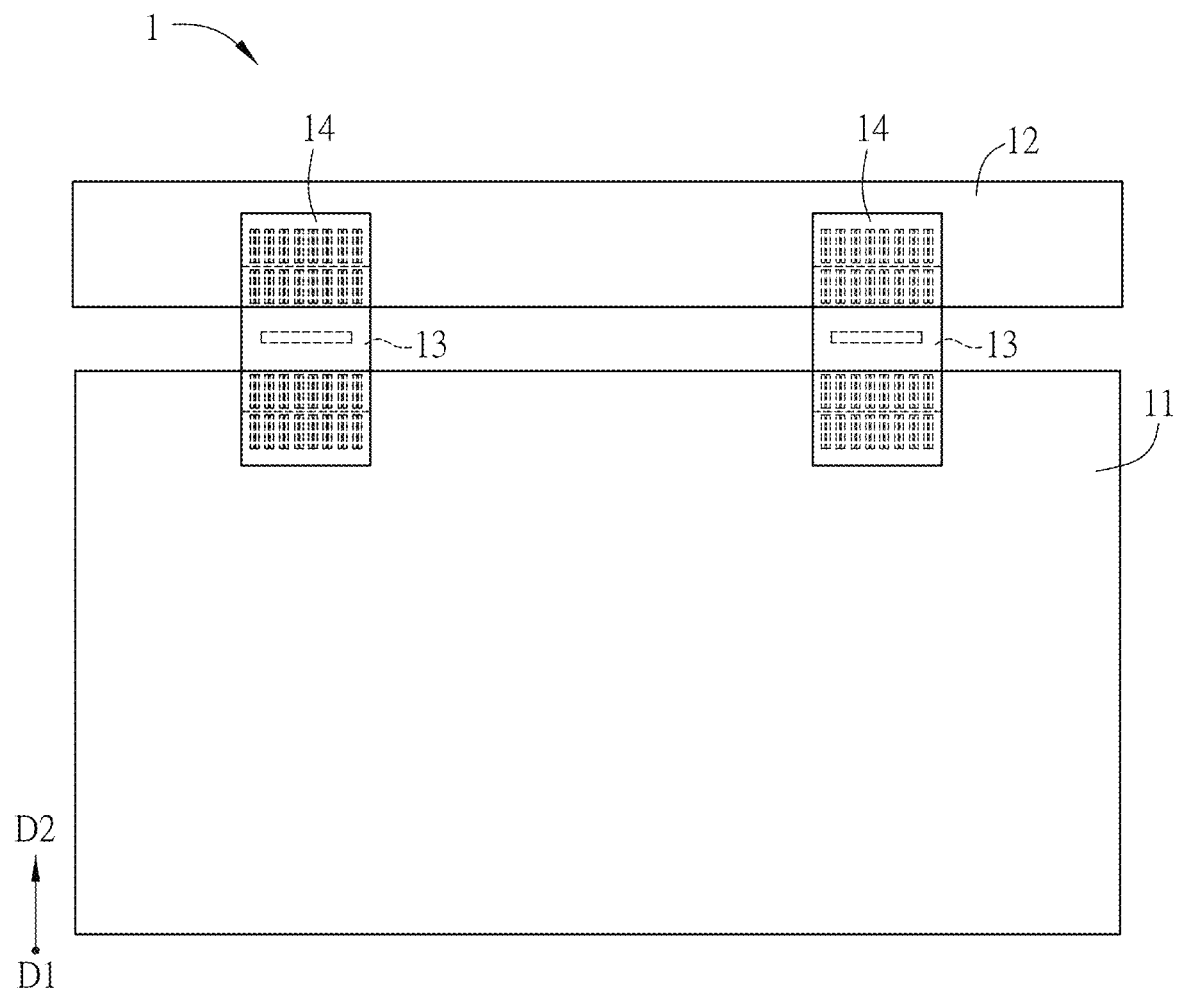
FIG. 1 is a schematic top view showing a display device of one embodiment of this disclosure.

Specific structural and functional details disclosed herein are merely representative and are for purposes of describing example embodiments of the present invention. However, the present invention may be embodied in many alternate forms, and should not be interpreted as being limited to the embodiments set forth herein.

In the description of the present invention, it is to be understood that the term "center", "lateral", "upper", "lower", "left", "right", "vertical", "horizontal", "top", "bottom", "inner", "outer" and other indicated orientation or positional relationships are based on the location or position relationship shown in the drawings, and are for convenience of description of the present invention only and to simplify the description, and not indicate or imply that refers to devices or elements must have a specific orientation, the orientation of a particular configuration and operation, therefore, cannot be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present invention, unless otherwise specified, the meaning of "more" is two or more. Further, the term "comprising" and any variations thereof, are intended to cover non-exclusive inclusion.

In the description of the present invention, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present invention.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, as used herein the term "comprising" and/or "comprising," as used herein, specify the presence of stated features, integers, steps, operations, elements, and/or components, but do not preclude the presence or addition of one or more other features, integers, steps, operations, elements, components, and/or combinations thereof.

The display device of preferable embodiments of this disclosure will be further described in detail with reference to FIGS. 1 to 5, and same unit is represented by the same reference numerals.

A display device of this disclosure comprises, for example but without limitation to, a liquid crystal display device (LCD) or an organic light emitting diode display device (OLED). In the following embodiments, the liquid crystal display device is taken as an example for illustration. The same principle may also be applied to the organic light emitting diode display device, and detailed descriptions thereof will be omitted.

Figure 2:
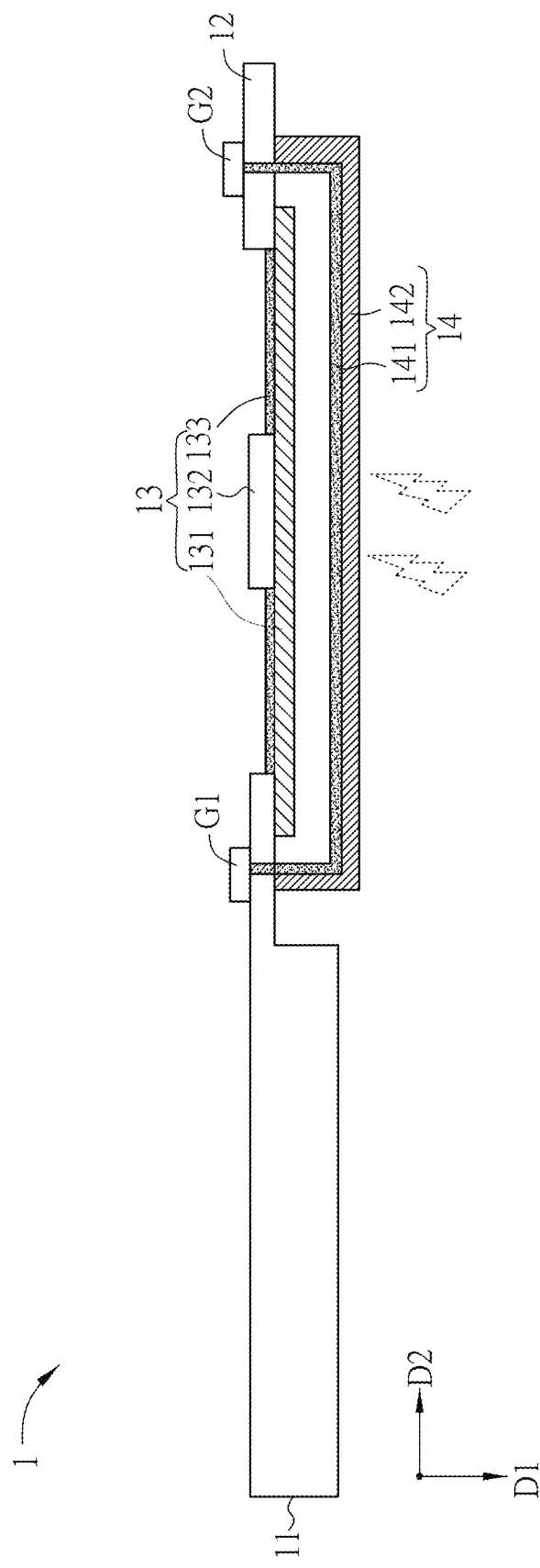
FIG. 2 is a schematic side view showing a display device of one embodiment of this disclosure.

FIG. 1 is a schematic top view showing a display device 1 of one embodiment of this disclosure, and FIG. 2 is a schematic side view showing a display device 1 of one embodiment of this disclosure. In FIG. 1, only a display panel 11, a control circuit board 12, a driving circuit board 13 and a circuit substrate 14 are shown, and other components are not shown. In addition, it should be noted that FIG. 1 shows that the circuit substrate 14 is disposed above the driving circuit board 13, and FIG. 2 shows that the driving circuit board 13 is disposed above the circuit substrate 14.

As shown in FIG. 1, the display device 1 comprises a display panel 11, a control circuit board 12, a driving circuit board 13 and a circuit substrate 14.

The display panel 11 may be an active matrix type display panel or a passive matrix type display panel. Taking the active matrix type display panel as an example, the active matrix type display panel may comprise a thin film transistor substrate, a color filter substrate and a liquid crystal layer. The liquid crystal layer is interposed between the thin film transistor substrate and the color filter substrate. The thin film transistor substrate may have a plurality of scan lines, a plurality of data lines and a plurality of pixels, and the scan lines and the data lines are interleaved to form a pixel matrix. When the scan lines respectively receive a scan signal, the scan lines may be turned on, respectively, and a data signal corresponding to each row of pixels is transmitted to the pixels through the data lines, so that the display panel 11 can display frames. The specific structure of the display panel 11 may be found in the prior art, and detailed descriptions thereof will be omitted herein.

In addition, as shown in FIG. 2, the display panel 11 has a first ground terminal G1, and the control circuit board 12 has a second ground terminal G2. The first ground terminal G1 may be a ground terminal of a matrix circuit (for example, comprising film layers such as a thin film transistor, a pixel electrode, a common electrode, a data line and a scan line and the like; or traces) disposed on the display panel 11, may be electrically connected to a ground wire, and may be connected to the ground of the circuit system. The second ground terminal G2 may be a ground terminal of a control circuit (such as, an electrical element, an integrated circuit and a trace) disposed on the control circuit board 12, may be electrically connected to the ground wire, and may be connected to the ground of the circuit system.

The driving circuit board 13 are respectively coupled to the display panel 11 and the control circuit board 12, and the control circuit board 12 transmits the control signal and drives the display panel 11 through the driving circuit board 13, so that the display panel 11 displays the images. In this embodiment, two opposite sides of the driving circuit board 13 are coupled to the display panel 11 and the control circuit board 12, respectively. In some embodiments, the driving circuit board 13 may be a flexible printed circuit board, such as a chip-on-film (COF) flexible printed circuit board or other flexible circuit boards, or a rigid circuit board, such as a printed circuit board. A chip-on-film (COF) flexible printed circuit board is taken as an example of the driving circuit board 13 in this embodiment. The COF flexible printed circuit board is a technique of bonding the die to the flexible printed circuit board (FPC) by way of flip chip bonding. Specifically speaking, it is a technique of directly bonding the integrated circuit (IC) to the film without using the conventional printed circuit board, so that the more slim and light and bendable objectives can be achieved.

The driving circuit board 13 (COF flexible printed circuit board) in this embodiment can comprises a flexible substrate 131, at least one first electroconductive wirings 133 and a drive element 132. The first electroconductive wirings 133 and the drive element 132 are disposed on the flexible substrate 131, and the drive element 132 is electrically connected to the control circuit board 12 and the display panel 11 through the first electroconductive wiring 133, such that the control circuit board 12 can transmit the signal through an electroconductive wiring 133 and a drive element 132 on a flexible substrate 131 to drive the display panel 11 to display the images.

The drive element 132 is, for example but without limitation to, an integrated circuit (IC), and may be a data drive IC or a scan drive IC, for example. The multiple first electroconductive wirings 133 disposed in a side-by-side manner on the flexible substrate 131 are taken as an example of the driving circuit board 13 in this embodiment. The first electroconductive wiring 133 may be made of a single material or may be a combination of a single-layer or multiple layers of multiple materials, and its material comprises, for example but without limitation to, a metal material, such as aluminum metal, copper metal or nanometer silver; a transparent electroconductive materials, such as indium-tin oxide (ITO) or indium-zinc oxide (IZO) and the like; or a combination thereof, and this disclosure is not restricted thereto.

The circuit substrate 14 is coupled to the display panel 11 and the control circuit board 12. The circuit substrate 14 in this embodiment comprises the at least one electrostatic discharge structure 141 and a flexible substrate 142, and the at least one electrostatic discharge structure 141 is disposed on the flexible substrate 142. The at least one electrostatic discharge structure 141 is coupled to the display panel 11 and the control circuit board 12, and electrically connected to the first ground terminal G1 and the second ground terminal G2. The electrostatic discharge structure 141 may comprise at least one second electroconductive wiring (not marked), and the circuit substrate 14 are respectively coupled to the first ground terminal G1 and the second ground terminal G2 through two ends of the second electroconductive wiring. In this embodiment, the circuit substrate 14 is, for example but without limitation to, a thin film flexible printed circuit board, and a plurality of electrostatic discharge structures 141 disposed in a side-by-side manner on the flexible substrate 142 are taken as an example. In different embodiments, the circuit substrate 14 may also be different types of flexible circuit boards or rigid circuit boards (such as a printed circuit board), and it is not restricted thereto.

In a projection direction D1 of the driving circuit board 13, the driving circuit board 13 and the at least one electrostatic discharge structures 141 is at least partially overlapped. In this embodiment, the driving circuit board 13 and a plurality of electrostatic discharge structures 141 (the multiple second electroconductive wirings) of the circuit substrate 14 completely overlapped in a direction D1 are taken as an example. Upon implementation, a second electroconductive wiring may be an electrostatic charge discharge path (no other electronic elements need to be disposed on the flexible substrate 142); two ends of the second electroconductive wiring are respectively connected to the first ground terminal G1 and the second ground terminal G2; and in the direction D1 perpendicular to the driving circuit board 13 or the circuit substrate 14, the driving circuit board 13 and the multiple second electroconductive wirings (a plurality of electrostatic discharge structures 141) of the circuit substrate 14 may be disposed in an overlapped manner (there is an interval therebetween). Thus, when electrostatic charges are produced, the electrostatic charges may be guided to the first ground terminal G1 or the second ground terminal G2 through at least one electrostatic discharge structures 141 (the second electroconductive wiring), and then guided to the system's ground to prevent the electrostatic charges from bombarding the driving circuit board 13 and from damaging the drive element 132 or the first electroconductive wiring 133. Thereby, the electrostatic protection ability of the display device 1 can be improved.

In different embodiments, a plurality of electrostatic discharge structures 141 may be respectively disposed on multiple flexible substrates 142 to constitute multiple circuit substrates 14, and the multiple circuit substrates 14 are disposed in an overlapped manner in the direction D1. In addition, in the projection direction D1 of the driving circuit board 13, the driving circuit board 13 and the a plurality of electrostatic discharge structures 141 of the multiple flexible substrates 142 of the multiple circuit substrates 14 are disposed in an overlapped manner. Thereby, when electrostatic charges are produced, the electrostatic charges may be similarly guided to the first ground terminal G1 or the second ground terminal G2 through at least one electrostatic discharge structures 141 (the second electroconductive wiring), and then guided to the system's ground to improve the electrostatic protection ability.

Figure 3:
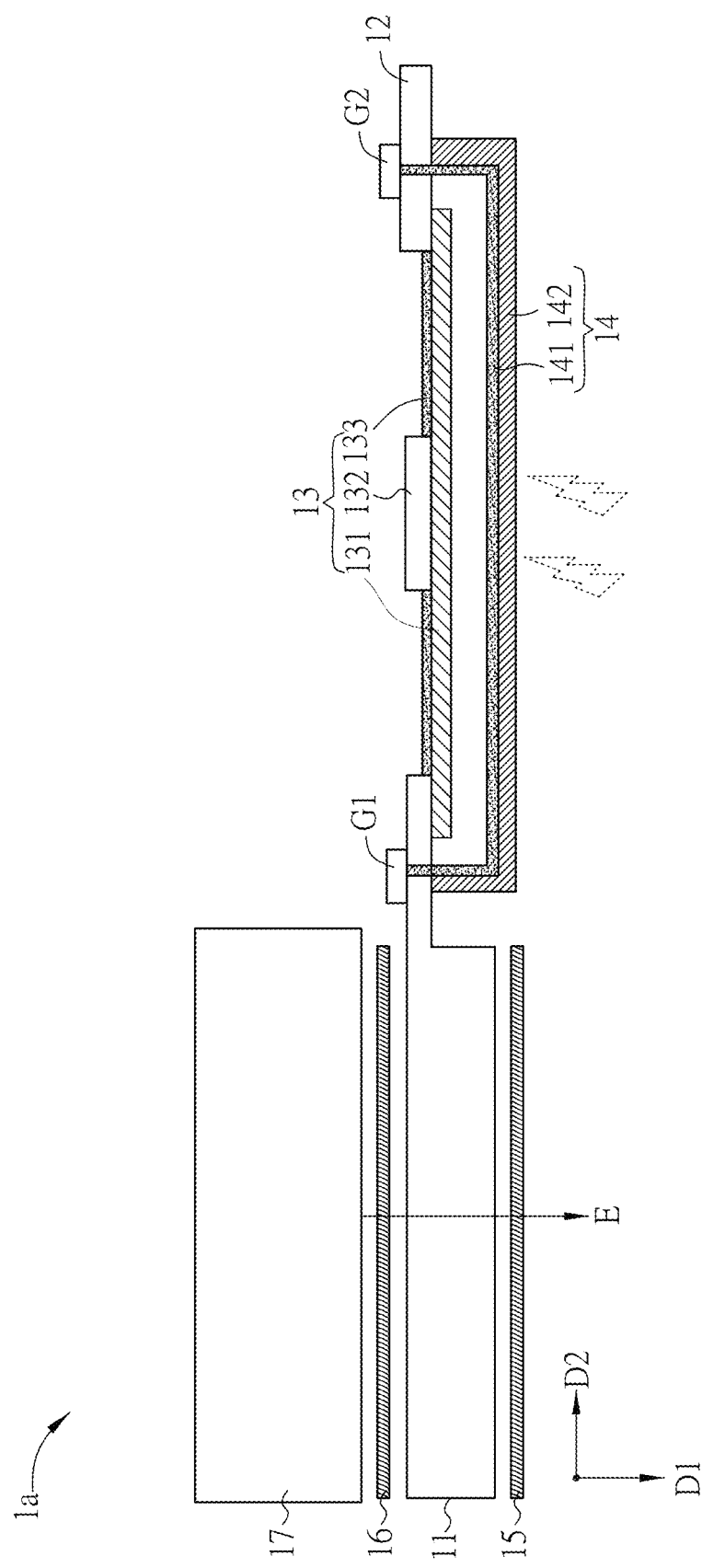
FIGS. 3 to 5 are schematic side views showing display devices of different implementation aspects of this disclosure, respectively.
Figure 4:
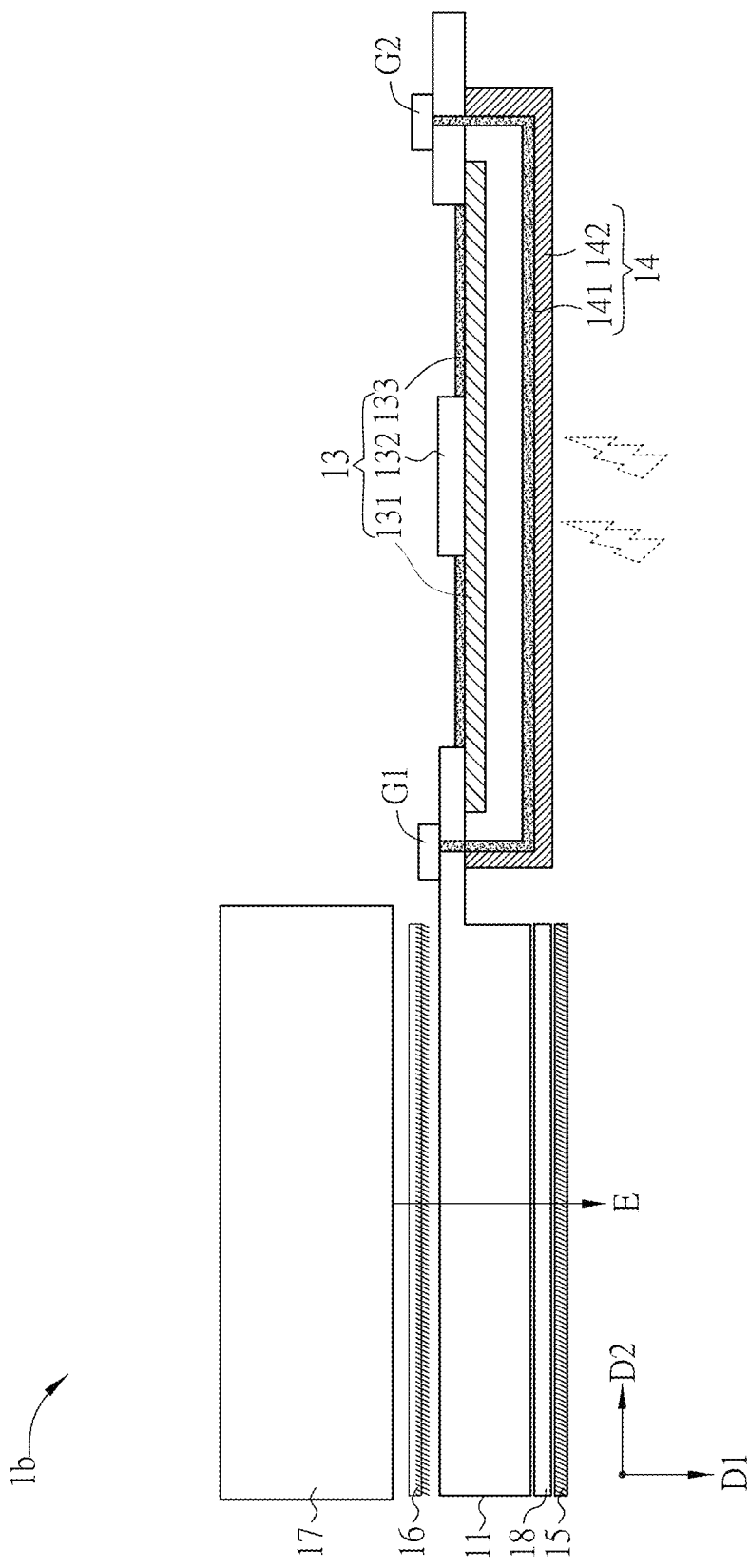
Figure 5:
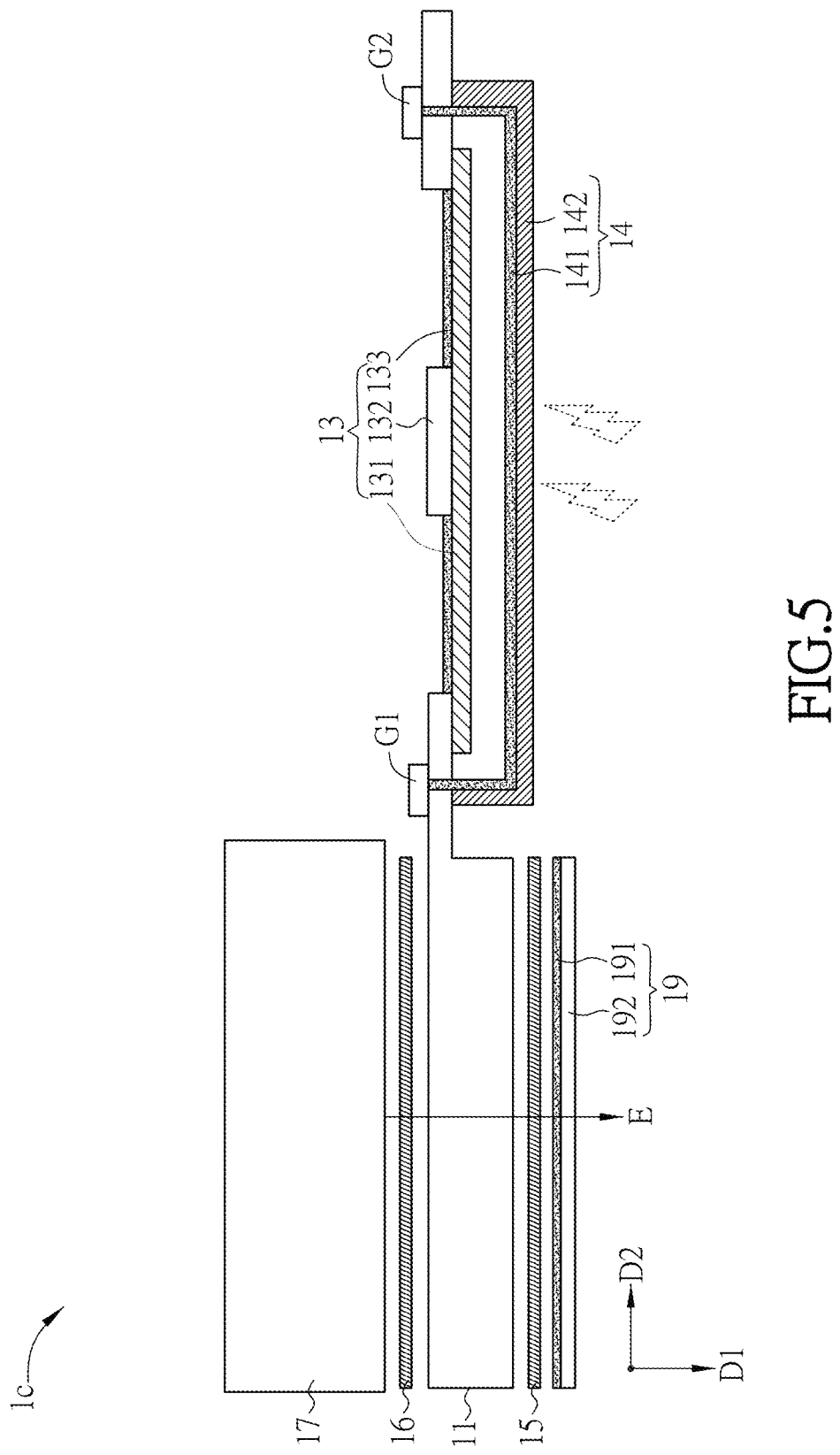

In addition, FIGS. 3 to 5 are schematic side views showing display devices 1a to 1c, respectively, according to various embodying modes of this disclosure.

As shown in FIG. 3, the main difference from the display device 1 of FIG. 2 is that the display device 1a can further comprises two polarizers 15, 16 and a backlight module 17, and the two polarizers 15, 16 are respectively disposed on two opposite surfaces of the display panel 11, and the backlight module 17 is disposed opposite to the display panel 11 and can output light rays E to pass through the display panel 11 and polarizers 15 and 16. The polarizer 16 in this embodiment is disposed on one side of the display panel 11 close to the backlight module 17, and the polarizer 15 is disposed on one side of the display panel 11 away from the backlight module 17. Using the polarizers 15 and 16 having absorption axes substantially different from each other by 90 degrees, and then controlling the electric field strength of liquid crystal molecules can make the liquid crystal molecules of the display panel 11 deflect to modulate the polarization property of the light rays E, so that the display panel 11 achieves the objective of displaying the image.

In addition, as shown in FIG. 4, the main difference from the display device 1a of FIG. 3 is that the display device 1b can further comprises a touch sensing circuit 18 disposed on the display panel 11. The touch sensing circuit 18 in this embodiment is disposed between the display panel 11 and the polarizer 15. In some embodiments, the touch sensing circuit 18 may be located on, for example, the surface of the color filter substrate of the display panel 11 away from the backlight module 17, so that a display device 1b may be an on-cell type touch device.

In different embodiments, the touch sensing circuit 18 may be disposed inside the display panel 11. For example, the touch sensing circuit 18 may be located on the surface of the color filter substrate of the display panel 11 close to the liquid crystal layer, or located on the surface of the thin film transistor of the display panel 11 close to the liquid crystal layer (not shown in the figures), so that the display device may be an in-cell type touch device.

In addition, as shown in FIG. 5, the main difference from the display device 1a of FIG. 3 is that the display device 1c can further comprises a touch panel 19 disposed opposite to the display panel 11. The touch panel 19 in this embodiment is disposed on one side of the polarizer 15 away from the display panel 11, and may comprise a touch sensing circuit 191 and a protection substrate 192. The touch sensing circuit 191 is disposed on the surface of the protection substrate 192 close to the display panel 11, so that a display device 1c is an add-on touch device, and is an one glass solution (OGS) touch device. In some embodiments, the protection substrate 192 may be a protection film layer or a protection glass.

In addition, other technical features of the display devices 1a to 1c may refer to the same elements of the display device 1, and detailed descriptions thereof will be omitted.

In summary, in the display device provided by this disclosure, the driving circuit board is coupled to the display panel and the control circuit board. The driving circuit board is the chip-on-film (COF) flexible printed circuit board. The control circuit board drives the display panel through the driving circuit board. At least one electrostatic discharge structures is coupled to the display panel and the control circuit board, and the electrostatic discharge structure is electrically connected to the first ground terminal of the display panel and the second ground terminal of control circuit board. In the projection direction of the driving circuit board, and the driving circuit board and the electrostatic discharge structure are at least partially overlapped. Accordingly, when electrostatic charges generate, the electrostatic charges may be conducted to the first ground terminal of the display panel or the second ground terminal of the control circuit board through said at least one electrostatic discharge structures so as to prevent damages to the device or circuits resulting from the electrostatic charges from bombarding the chip-on-film (COF) flexible printed circuit board. Hence, the electrostatic charge protective effect of the display device can be improved.

The foregoing descriptions are only illustrative and not a limiting sense.

Any without departing from the spirit and scope of the present writing, the modifications or changes for the equivalents thereof are all included in the scope of the present patent application.

What is claimed is:

1. A display device, comprising:
a display panel having a first ground terminal electrically connected to a ground wire;
a control circuit board having a second ground terminal electrically connected to the ground wire;
a driving circuit board coupled to the display panel and the control circuit board, wherein the driving circuit board is a chip-on-film (COF) flexible printed circuit board, and the control circuit board drives the display panel through the driving circuit board; and
a circuit substrate coupled to the display panel and the control circuit board, wherein the circuit substrate comprises a plurality of electrostatic discharge structures and at least one flexible substrate, the plurality of electrostatic discharge structures are disposed on the at least one flexible substrate, the at least one flexible substrate is connected with the display panel and the control circuit board, the plurality of electrostatic discharge structures are electrically connected to the first ground terminal and the second ground terminal;
wherein the driving circuit board and the circuit substrate are at least partially overlapped.

2. The display device according to claim 1, wherein the display panel is an active matrix type display panel or a passive matrix type display panel.

3. The display device according to claim 1, wherein the display panel comprises a thin film transistor substrate, a color filter substrate and a liquid crystal layer interposed between the thin film transistor substrate and the color filter substrate.

4. The display device according to claim 1, wherein the plurality of electrostatic discharge structures are disposed in a side-by-side manner and on the flexible substrate of the circuit substrate.

5. The display device according to claim 1, wherein the plurality of electrostatic discharge structures are disposed on the plurality of flexible substrates of the circuit substrate.

6. The display device according to claim 5, wherein the driving circuit board and the plurality of flexible substrates of the circuit substrate are disposed in an overlapped manner in the projection direction of the driving circuit board.

7. The display device according to claim 1, wherein the driving circuit board comprises another flexible substrate, a first electroconductive wiring and a driving element, the first electroconductive wiring and the driving element are disposed on the another flexible substrate, and the driving element is electrically connected to the control circuit board and the display panel through the first electroconductive wiring.

8. The display device according to claim 7, wherein the driving element is an integrated circuit.

9. The display device according to claim 1, wherein the driving circuit board and a plurality of the electrostatic discharge structures are completely overlapped.

10. The display device according to claim 1, wherein the circuit substrate is a thin film flexible printed circuit board.

11. The display device according to claim 1, further comprising:
two polarizers respectively disposed on two opposite surfaces of the display panel.

12. The display device according to claim 1, further comprising:
a backlight module disposed opposite to the display panel.

13. The display device according to claim 1, further comprising:
a touch sensing circuit disposed on the display panel.

14. The display device according to claim 1, further comprising:
a polarizer disposed on the display panel; and
a touch sensing circuit disposed between the display panel and the polarizer.

15. The display device according to claim 1, further comprising:
a touch panel disposed opposite to the display panel.

16. The display device according to claim 15, wherein the touch panel comprises a touch sensing circuit and a protection substrate, and the touch sensing circuit is disposed on a surface of the protection substrate close to the display panel.

17. The display device according to claim 1, wherein the display device is a liquid crystal display device or an organic light emitting diode display device.

18. A display device, comprising:
a display panel having a first ground terminal electrically connected to a ground wire;
a control circuit board having a second ground terminal electrically connected to the ground wire;
a driving circuit board coupled to the display panel and the control circuit board, wherein the control circuit board drives the display panel through the driving circuit board, and the driving circuit board is a chip-on-film (COF) flexible printed circuit board and comprises a first electroconductive wiring and a driving element; and
a circuit substrate coupled to the display panel and the control circuit board, and comprising at least one second electroconductive wiring, at least one electrostatic discharge structure and at least one flexible substrate, the at least one electrostatic discharge structure is disposed on the at least one flexible substrate, the at least one flexible substrate is connected with the display panel and the control circuit board, two ends of the second electroconductive wiring are respectively connected to the first ground terminal and the second ground terminal;
wherein the driving circuit board and the circuit substrate are at least partially overlapped in a projection direction of the driving circuit board, and
wherein the driving circuit board further comprises another flexible substrate, the first electroconductive wiring and the driving element are disposed on the another flexible substrate, and the driving element is electrically connected to the control circuit board and the display panel through the first electroconductive wiring.

19. A display device, comprising:
a display panel having a first ground terminal electrically connected to a ground wire;
a control circuit board having a second ground terminal electrically connected to the ground wire;
a driving circuit board coupled to the display panel and the control circuit board, wherein the driving circuit board is a chip-on-film (COF) flexible printed circuit board, and the control circuit board drives the display panel through the driving circuit board; and
a circuit substrate coupled to the display panel and the control circuit board, wherein the circuit substrate comprises an electrostatic discharge structure and a flexible substrate, the electrostatic discharge structure is disposed on the flexible substrate, the flexible substrate is connected with the display panel and the control circuit board, the electrostatic discharge structure is electrically connected to the first ground terminal and the second ground terminal,
wherein the driving circuit board and the circuit substrate are at least partially overlapped.

20. The display device according to claim 19, wherein the electrostatic discharge structure comprises at least one electroconductive wiring, and two ends of the electroconductive wiring are respectively connected to the first ground terminal and the second ground terminal.

* * * * *